INVENTORS
MYRON L. GREENBERG
PHILLIP J. ROSEN

United States Patent Office 3,518,899
Patented July 7, 1970

3,518,899
SYSTEM FOR ACCURATE POSITIONING OF ROTARY TABLES
Myron L. Greenberg, Union Lake, and Phillip J. Rosen, Oak Park, Mich., assignors to The Babcock & Wilcox Company, New York, N.Y., a corporation of New Jersey
Filed Nov. 5, 1968, Ser. No. 773,527
Int. Cl. B23q 17/00
U.S. Cl. 74—816     12 Claims

ABSTRACT OF THE DISCLOSURE

A system for accurate positioning of rotary tables wherein a motor of predetermined capacity is utilized to drive the rotary table in either of two directions and a second motor of lesser capacity is provided. The second motor is caused to tend to drive the rotary table in the opposite direction from that in which the first motor is driving the table with a magnitude of torque having a predetermined proportion with respect to the torque applied by the first motor.

---

This invention relates to the accurate positioning of a rotary table.

In the accurate positioning of rotary tables, one of the most difficult problems is that of drive train backlash which inherently precludes the accurate positioning of the table in operating to or from predetermined points, especially in situations in which the table must be positioned to a large number of points (in contrast to a simple index table in which four or six points only are used).

In particular, if hydrostatic table bearings are used, as is quite common in tables of large diameter and/or of very precise axial characteristics, the nearly complete absence of static friction on the axis makes it necessary for the drive train to be of some antibacklash type. In tables with conventional bearings, it is usual to have a considerable amount of static friction available from the bearing, which is a disadvantage from the point of view of load on the drive train but does at least lock the table in place when the drive is off, or when only a small amount of drive torque is available, such as near a positioning null.

In tables with precise positioning requirements it is normal to leave the servo on all the time, even after positioning is completed. This is called a "servo-locked" mode of operation, and it is very satisfactory with conventional bearing tables. However, because of the lack of table friction, it tends to be unstable with hydrostatic bearing tables. This is particularly true, since almost all servos commonly used have a linear characteristic near the desired position; that is, the available torque is more or less linearly proportioned to the distance from null, dropping to zero at null. Thus the table is nearly uncontrolled when very close to null.

Among the objects of the present invention are to provide a system for accurate positioning of rotary tables which system applies a preload torque to preload the table which torque is in predetermined proportion to the drive torque at all magnitudes of the drive torque; which system has no static friction and is always operable; and which system can be used at any position in the 360° range. Another object is to provide a system which can be used in the servo-locked mode with a hydrostatic bearing table as well as with conventional tables.

Figure 1:
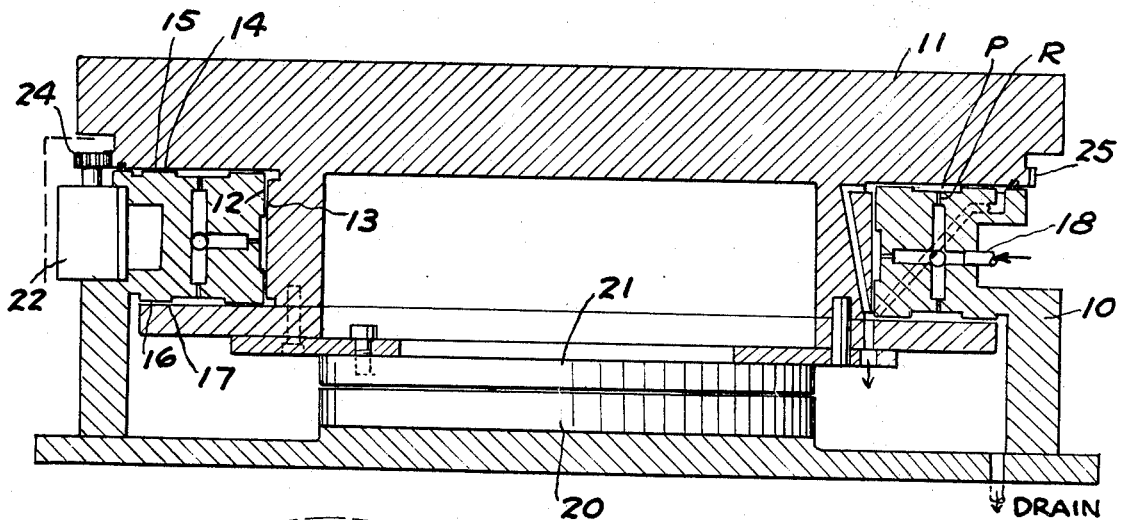
FIG. 1 is a vertical sectional view through a rotary table embodying the invention.

Referring to FIG. 1, the system embodying the invention is particularly adapted for use with a rotary table of the type which utilizes hydrostatic pressure pads to maintain the rotary table in stable, frictionless relation to a base such as shown in the United States patent to Porath 3,193,334. Specifically, the rotary table comprises a base 10 and a rotary table 11 having complementary axial surfaces 12, 13 and complementary vertically spaced radial surfaces 14, 15 and 16, 17.

Each of the surfaces 13, 14, 16 has circumferentially spaced pressure pads or recesses P therein and a restrictor R associated with each pressure pad, preferably in the form of a capillary tube. Fluid under pressure is supplied through passages 18 to the restrictors and pressure pads so that the fluid flows out of the pressure pads outwardly between the axial and radial surfaces to maintain the rotary table in accurate frictionless relation to the base 10.

In accordance with the invention, the elements 20, 21 of a transducer are mounted on the base 10 and rotary table 11, respectively, to provide a position signal that is proportional to the angular position of the rotary table 11 with respect to the base 10. A typical transducer which may be used is a precision rotary induction transducer manufactured under the trademark Inductosyn and sold by Inductosyn Corporation.

Figure 2:
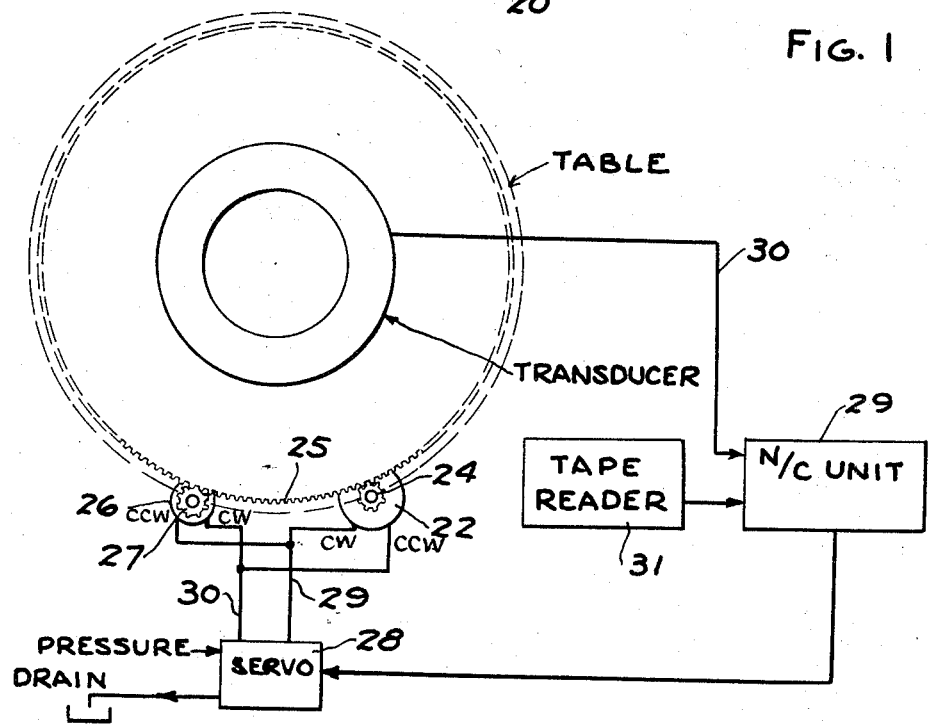
FIG. 2 is a schematic diagram of the positioning system embodying the invention and utilized in connection with the table shown in FIG. 1.

As shown in FIG. 2, a first motor 22, preferably of the reversible hydraulic type, is adapted to drive the rotary table through gear 24 on its output shaft, the gear 24 meshing with teeth 25 on the periphery of the table. A second motor 26, preferably of a reversible hydraulic type, having a torque per p.s.i. rating appreciably less than that of the motor 22, is similarly engaged with the table through a pinion 27, also meshed with the teeth 25. It will be understood that although we have described and illustrated a single reduction, nearly any workable intermediate gearing arrangement and type will be satisfactory, as long as their interaction is not too erratic. One might have two or more reductions, using spur, bevel or helical gears and still have a workable system.

The fluid conduits to the motors 22, 26 are interconnected so that when fluid is supplied to the motor 22 to drive the table in one direction, fluid is supplied to the motor 26 to tend to drive the motor 26, and, in turn, the rotary table in the opposite direction.

Thus, fluid from a servo valve 28 is supplied to a conduit 29 and conduit 30 selectively. When fluid is supplied to conduit 29, it will flow to the inlet of motor 22 tending to cause clockwise rotation thereof, designated as CW, and to the inlet of motor 26 tending to cause counterclockwise rotation thereof, designated as CCW. Similarly, when fluid is supplied to conduit 30, it will flow to the inlet of motor 22 tending to cause counterclockwise rotation thereof, designated as CCW, and to the inlet of motor 26 tending to cause clockwise rotation thereof, designated as CW.

Servo valve 28 is controlled by a numerical control unit 29. The output of the transducer 20, 21 is supplied through an electrical connection 30 to the unit 29 as is a signal from a tape reader 31.

In operation, the tape reader 31 sends a signal to the numerical control unit 29 for a predetermined position of the rotary table. The output signal in analog form from the unit 29 operates servo valve 28 to which hydraulic fluid under pressure is supplied. Because of the inherent torque ratio between the two motors 22, 26, a net preload torque is always applied to the rotary table which is proportional to, but much less than, the main drive torque. This may preferably be on the order of 5 to 20 percent.

As a result, the only torque exerted by the preload system is in direct proportion to the driving torque. As the table approaches the desired position, and the driving torque to the table through the servo valve is proportionately reduced and nears a null position, the preload on the table also lessens and reaches a null or zero position.

In place of the hydraulic motors 22, 26, electric motors may be used with a suitable output network from the amplifier, if large gear ratios are to be employed, for example.

What is claimed is:
1. The combination comprising
   a rotary table,
   a first motor of predetermined capacity drivingly connected to said rotary table,
   a second motor having a lesser capacity than the first motor drivingly connected to said rotary table,
   and signal means for controlling simultaneously said first and second motors,
   said signal means being such that a first signal is given to said first motor to rotate said table in a given direction and a second signal proportional and less than the signal to said first motor is given to said second motor to tend to drive the rotary table in an opposite direction.
2. The combination set forth in claim 1 including means for sensing the position of said table and cancelling said signals as said table approaches a predetermined position corresponding to the desired displacement of the table.
3. The combination set forth in claim 1 wherein said motors comprise reversible hydraulic motors,
   a source of fluid,
   said signal means includes valve means for selectively supplying fluid to said motors,
   said hydraulic motors being interconnected in a manner such that when fluid is supplied to drive said first motor in a direction to rotate the rotary table in one direction, fluid is supplied to said second motor in a direction to tend to rotate the rotary table in the opposite direction.
4. The combination set forth in claim 1 wherein said rotary table comprises a base,
   one of said base and said rotary table having complementary surfaces,
   one of said surfaces having a plurality of pressure pads therein,
   a restrictor associated with each said pad,
   and means for supplying fluid under pressure to said restrictor.
5. The combination set forth in claim 1 including program means for actuating said signal means to produce a predetermined movement of said rotary table.
6. The combination set forth in claim 5 including means responsive to the position of said rotary table for actuating said signal means to interrupt the movement of said table.
7. The combination comprising
   a rotary table,
   a first motor of predetermined capacity drivingly connected to said rotary table,
   a second motor having a lesser capacity than the first motor drivingly connected to said rotary table,
   and signal means for controlling simultaneously said first and second motors,
   said signal means being such that when said first motor is operated to drive said rotary table in a given direction, said second motor is operated to tend to drive the rotary table in an opposite direction with a lesser torque.
8. The combination set forth in claim 7 wherein said motors comprise reversible hydraulic motors,
   a source of fluid,
   said signal means includes valve means for selectively supplying fluid to said motors,
   said hydraulic motors being interconnected in a manner such that when fluid is supplied to drive said first motor in a direction to rotate the rotary table in one direction, fluid is supplied to said second motor in a direction to tend to rotate the rotary table in the opposite direction.
9. The combination set forth in claim 8 including program means for actuating said signal means to produce a predetermined movement of said rotary table.
10. The combination set forth in claim 9 including means responsive to the position of said rotary table for actuating said signal means to interrupt the movement of said table.
11. The combination set forth in claim 7 wherein said rotary table comprises a base,
    one of said base and said rotary table having complementary surfaces,
    one of said surfaces having a plurality of pressure pads therein,
    a restrictor associated with each said pad,
    and means for supplying fluid under pressure to said restrictor.
12. The method of precisely positioning a rotary table which comprises
    utilizing a first motor for driving the table and a second motor drivingly connected to the table,
    applying a predetermined signal to drive the rotary table in one direction through one said motor and simultaneously applying a signal of lesser magnitude proportionately to the other motor to tend to drive the table in the opposite direction at a proportionately lesser torque.

References Cited
UNITED STATES PATENTS 3,072,836   1/1963   Eisengrein _____ 74—821 XR
3,412,633   11/1968  Huntley _____ 74—821

FRED C. MATTERN, Jr., Primary Examiner

F. D. SHOEMAKER, Assistant Examiner

U.S. Cl. X.R.
74—821, 825